Jan. 22, 1963 W. H. NEWELL 3,075,096
CONVERTER OF HEAT INTO ELECTRICAL ENERGY
Filed July 19, 1960
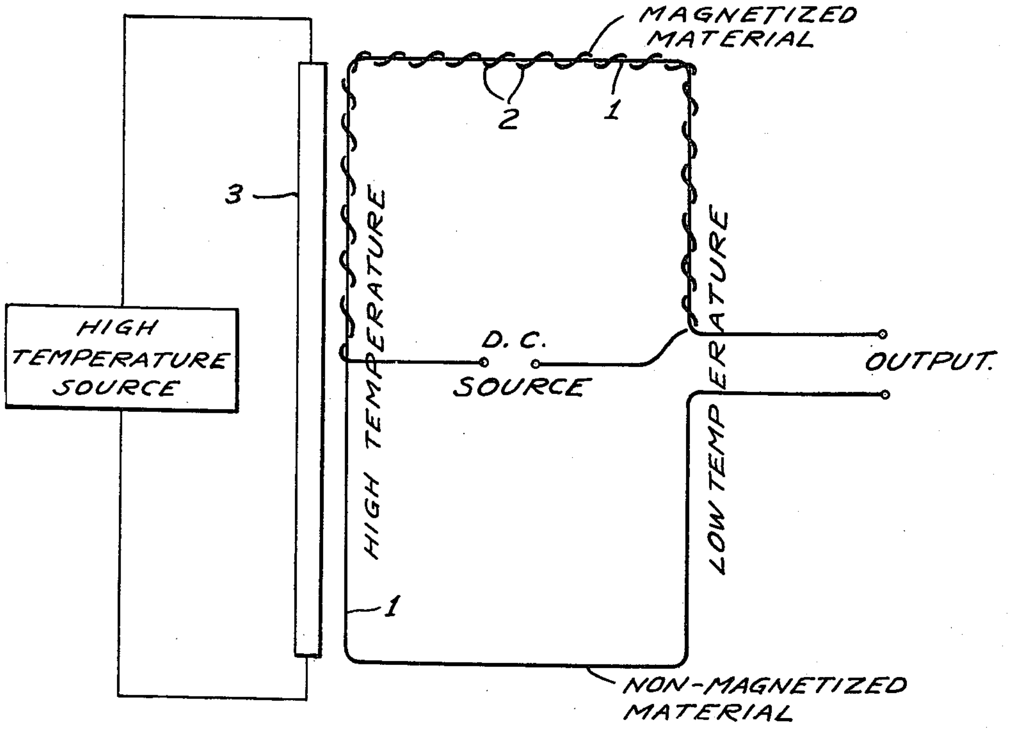
Inventor
WILLIAM H. NEWELL
By
Borst and Borst Attorneys United States Patent Office 3,075,096

Patented Jan. 22, 1963

3,075,096
CONVERTER OF HEAT INTO ELECTRICAL ENERGY

William H. Newell, Mount Vernon, N.Y., assignor to Sperry Rand Corporation, Ford Instrument Company Division, Wilmington, Del., a corporation of Delaware Filed July 19, 1960, Ser. No. 43,834
1 Claim. (Cl. 310—4)

This invention relates to an energy converter and particularly to a converter which is adapted to effect a direct conversion of heat energy to electrical energy.

According to the Seebeck effect, which is the reverse of the Peltier effect, a current flows through a thermocouple when the two junctions of the different metals constituting the thermocouple are at different temperatures. I have found that the same phenomenon will occur if a conductor of uniform material is used providing one portion of the conductor is placed in a different magnetic state from the balance of the conductor. If, for example, one portion of the material is magnetized and the rest is non-magnetized, the magnetized and non-magnetized portions will correspond to the two different materials of the thermocouple and will demonstrate the Seebeck effect if the two junctions of the magnetized and non-magnetized portions are at different temperatures. This invention contemplates the use of a conductor which is partially subjected to a high temperature ambient and is partially magnetized, the conductor being of uniform material from its high to its low temperature zones. The desired advantage of employing a conductor of the same material throughout is the consequent reduction of radiation effect which is otherwise present when different materials are placed in juxtaposition with a high temperature source such as a hot reactor core. A more detailed description of the component arrangement is described below, the description being taken in conjunction with the drawing which illustrates one embodiment of my invention.

Referring to the drawing, a conductor 1 of uniform and magnetizable material is partially magnetized by a coil conductor 2 arranged on one section thereof and connected to a D.C. source. A portion of the magnetized and a portion of the non-magnetized sections of the conductor are disposed in proximity to a core 3 which is thermally coupled to high temperature source. As a consequence of this arrangement, there is effected in the relatively low temperature output end of the conductor a potential difference similar to that obtained with two different conducting materials of a thermocouple but with minimal radiation effect in the conductor of uniform material as compared with that effect in the thermocouple. An A.C. output will be available on substituting an A.C. source for the D.C. source.

Various modifications may be effected in the single embodiment of invention herein described without departing from the principle and scope of invention as defined in the appended claim.

What is claimed is:

A converter comprising a conductor formed of the same magnetizable material throughout its length, means for imparting a magnetization differential in said conductor and means for subjecting a relatively high magnetized portion of said conductor and a relatively low magnetized portion of said conductor joined to said high magnetized portion to the same high temperature ambient, the output of said converter comprising a pair of output terminals, one terminal being connected to one side of the circuit and the other terminal being connected to the other side of the circuit with the said one side including a relatively high magnetized portion of the conductor and the said other side including a relatively low magnetized portion of said conductor.

References Cited in the file of this patent

UNITED STATES PATENTS 375,408 Acheson ---------------- Dec. 27, 1887